United States Patent
Kim et al.

(10) Patent No.: US 9,877,249 B2
(45) Date of Patent: Jan. 23, 2018

(54) DEVICE, METHOD FOR MANAGING CARRIER OF BASE STATION, TERMINAL AND METHOD FOR MANAGING CARRIER THEREOF

(75) Inventors: Juhee Kim, Daejeon (KR); Eunkyung Kim, Daejeon (KR); Soojung Jung, Daejeon (KR); Jae Sun Cha, Seoul (KR); Kwang Jae Lim, Seoul (KR); Hyun Lee, Seoul (KR); Chul Sik Yoon, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 323 days.

(21) Appl. No.: 13/266,919

(22) PCT Filed: Apr. 28, 2010

(86) PCT No.: PCT/KR2010/002677
§ 371 (c)(1),
(2), (4) Date: Oct. 28, 2011

(87) PCT Pub. No.: WO2010/126298
PCT Pub. Date: Nov. 4, 2010

(65) Prior Publication Data
US 2012/0051309 A1    Mar. 1, 2012

(30) Foreign Application Priority Data

| Apr. 28, 2009 | (KR) | 10-2009-0037203 |
| Aug. 28, 2009 | (KR) | 10-2009-0080434 |
| Apr. 28, 2010 | (KR) | 10-2010-0039355 |

(51) Int. Cl.
*H04W 4/00* (2009.01)
*H04W 36/06* (2009.01)
(Continued)

(52) U.S. Cl.
CPC .......... *H04W 36/06* (2013.01); *H04W 36/00* (2013.01); *H04W 36/18* (2013.01); *H04W 72/0453* (2013.01)

(58) Field of Classification Search
CPC . H04W 36/00; H04W 36/0088; H04W 36/08; H04W 36/18; H04W 36/0005;
(Continued)

(56) References Cited

U.S. PATENT DOCUMENTS 7,363,039 B2 * 4/2008 Laroia et al. ............... 455/448
7,417,964 B2   8/2008 Cho et al.
(Continued)

FOREIGN PATENT DOCUMENTS

CN    1722640 A    1/2006
CN    101277145 A    10/2008
(Continued)

OTHER PUBLICATIONS

Ruixia Zhang, Intra-BS Carrier Handover for IEEE 802.16m, 2008.*
(Continued)

*Primary Examiner* — Harun Chowdhury
(74) *Attorney, Agent, or Firm* — Rabin & Berdo, P.C.

(57) ABSTRACT

A method in which a terminal that supports a multi-carrier manages a primary carrier, including: receiving a primary carrier change command from a base station; and changing the primary carrier from a serving primary carrier to a target primary carrier.

20 Claims, 6 Drawing Sheets

(51) Int. Cl.
*H04W 36/00* (2009.01)
*H04W 36/18* (2009.01)
*H04W 72/04* (2009.01)

(58) Field of Classification Search
CPC ..... H04W 36/06; H04W 36/28; H04W 36/24; H04W 72/0453; H04L 5/0098; H04L 27/0006
USPC ....... 370/322, 329, 331, 332, 348, 431, 443, 370/328; 455/436, 448
See application file for complete search history.

(56) References Cited

U.S. PATENT DOCUMENTS

| | | | |
|---|---|---|---|
| 7,672,250 | B2 | 3/2010 | Czaja et al. |
| 8,620,334 | B2 | 12/2013 | Terry et al. |
| 2007/0268900 | A1 | 11/2007 | Park et al. |
| 2008/0192660 | A1 | 8/2008 | Li et al. |
| 2009/0059947 | A1 | 3/2009 | Barthel et al. |
| 2009/0310563 | A1* | 12/2009 | Chou et al. ............. 370/331 |
| 2010/0124201 | A1* | 5/2010 | Griot et al. ............. 370/331 |
| 2010/0272067 | A1* | 10/2010 | Lu et al. ................. 370/331 |
| 2011/0116467 | A1* | 5/2011 | Jung et al. .............. 370/329 |
| 2011/0149912 | A1* | 6/2011 | Jung et al. .............. 370/331 |
| 2011/0216730 | A1 | 9/2011 | Kim et al. |
| 2011/0312326 | A1* | 12/2011 | Kwon et al. ............ 455/436 |
| 2012/0093103 | A1* | 4/2012 | Lee et al. ............... 370/329 |

FOREIGN PATENT DOCUMENTS

| | | |
|---|---|---|
| EP | 1735930 A1 | 12/2006 |
| EP | 2621215 A1 | 7/2013 |
| EP | 1735918 B1 | 9/2013 |
| JP | 2007533254 A | 11/2007 |
| JP | 2012505590 A | 3/2012 |
| JP | 2012520633 A | 9/2012 |
| KR | 10-0689382 | 2/2007 |
| KR | 2007-0074564 A | 7/2007 |
| KR | 2007-0112573 A | 11/2007 |
| KR | 2008-0071553 A | 8/2008 |

OTHER PUBLICATIONS

Advanced Air Interface (working document), Part 16: Air Interface for Fixed and Mobile Broadband Wireless Access Systems, IEEE, Mar. 2008.*

Ruixia Zhang, Yuqin Chen, Wenhuan, Wang, Kaiying Lv, Min Liu, Nan Li, Huiying Fang, Hongyun Qu, ZTE Corporation, Xiaolu Dong, Ying Du, Daning Gong CATR, Juhee Kim, Sookjin Lee, Eunkyung Kim, Kyungsoo Kim, ETRI; "Intra-BS Carrier Handover for IEEE 802.16m"; IEEE 802.16 Broadband Wireless Access Working Group; Sep. 5, 2008.

Juhee Kim et al: "Proposed IEEE 802.16m Amendment Text on Primary Carrier Change; C80216m-09_0889", IEEE Draft; C80216M-09_0889, IEEE-SA, Piscataway, NJ USA, vol. 802.16m, Apr. 27, 2009, pp. 1-7, XP017733978.

Jaehee Cho et al: "Final Multi-Carrier RG Consensus SDD Text Proposal; C80216m-08_1491", IEEE Draft; C80216M-08_1491, IEEE- SA, Piscataway, NJ USA, vol. 802.16m, Nov. 13, 2008, pp. 1-12, XP017792110.

Juhee Kim et al: "Clarification on carrier management ; C80216m-09_0828", IEEE Draft; C80216M-09_0828, IEEE-SA, Piscataway, NJ USA, vol. 802.16m, Apr. 24, 2009, pp. 1-4, XP017792608.

* cited by examiner

DEVICE, METHOD FOR MANAGING CARRIER OF BASE STATION, TERMINAL AND METHOD FOR MANAGING CARRIER THEREOF

BACKGROUND OF THE INVENTION (a) Field of the Invention

The present invention relates to a device and method for managing a carrier of a base station, a terminal, and a method of managing a carrier of the terminal.

(b) Description of the Related Art

In a wireless communication system, a terminal and a base station can operate a plurality of carriers in order to extend a data transmission band, and the carrier is called a multi-carrier. In a wireless communication system that supports a multi-carrier, carriers are classified into two kinds, wherein one is a primary carrier and the other is a secondary carrier.

The primary carrier is a carrier for transmitting and receiving various control information and data between a base station and a terminal, and one of several carriers is used as a primary carrier.

The secondary carrier is a carrier for extending a data transmission band when transmitting and receiving control information through the primary carrier. In this case, resource allocation information about all carriers is transmitted through the primary carrier, and the terminal receives resource allocation information of the primary carriers, determines whether data of a secondary carrier are transmitted, and processes the corresponding data.

The primary carrier and the secondary carrier of the terminal can be changed while operating due to a reason such as a distribution of a load and a channel change.

SUMMARY OF THE INVENTION

Aspects of the present invention provide an effective procedure for changing an operation state of a carrier of a terminal in a wireless access system that supports a multi-carrier.

An exemplary embodiment of the present invention provides a method in which a terminal that supports a multi-carrier manages a primary carrier, the method including: receiving a primary carrier change command from a base station; and changing the primary carrier from a serving primary carrier to a target primary carrier.

The primary carrier change command may be received through a carrier management command (AAI_CM_CMD) message.

The AAI_CM_CMD message may include at least one of a target primary carrier index field, an indication of the next state of the serving primary carrier field, an action time (AT) field, and a ranging indicator field.

When the indication of the next state of the serving primary carrier field is set to "1", the serving primary carrier before being changed may sustain an active state as a secondary carrier after the changing of the primary carrier, and when the indication of the next state of the serving primary carrier field is set to "0", the serving primary carrier may be deactivated after the changing of the primary carrier.

After the changing of the primary carrier, a new carrier index of the serving primary carrier may be allocated to a previous carrier index of the target primary carrier, and a new carrier index of the target primary carrier may be allocated to a previous carrier index of the serving primary carrier.

Reception preparation of data and control information with the target primary carrier may be complete until a time in which the action time field is represented.

The method may further include performing ranging according to the ranging indicator field before a time in which the action time field is represented.

The AAI_CM_CMD message may include an action code field that is used for distinguishing at least one operation of a change of the primary carrier and a change of an active state and an inactive state of a secondary carrier.

The method may further include transmitting a message that notifies the base station of the change.

The transmitting of a message may be performed when the target primary carrier is in an inactive state.

The message that notifies the base station of the change may be transferred through a carrier management indication (hereinafter referred to as an 'AAI_CM_IND') massage.

The changing of the primary carrier may be performed without a scanning operation when the target primary carrier is in an active state.

The changing of the primary carrier may be performed after scanning the target primary carrier when the target primary carrier is in an inactive state.

The method may further include transmitting a request for a change of the primary carrier to the base station.

The request for a change of the primary carrier may be transferred through a carrier management request (AAI_CM_REQ) message, and the AAI_CM_REQ message may include a candidate list of the target primary carrier.

The method may further include transmitting MSG acknowledgement of the primary carrier change command to the base station.

Another embodiment of the present invention provides a method in which a base station that supports a multi-carrier manages a primary carrier, the method including: transmitting and receiving a control signal to and from a terminal using a serving primary carrier; and transmitting a primary carrier change command to the terminal.

The primary carrier change command may be transmitted through a carrier management command (AAI_CM_CMD) message.

The AAI_CM_CMD message may include at least one of a target primary carrier index field, an indication of the next state of the serving primary carrier field, an action time (AT) field, and a ranging indicator field.

When the indication of the next state of the serving primary carrier field is set to "1", the serving primary carrier before being changed may sustain an active state as a secondary carrier after the changing of the primary carrier, and when the indication of the next state of the serving primary carrier field is set to "0", the serving primary carrier may be deactivated after the changing of the primary carrier.

After the changing of the primary carrier, a new carrier index of the serving primary carrier may be allocated to a previous carrier index of the target primary carrier, and a new carrier index of the target primary carrier may be allocated to a previous carrier index of the serving primary carrier.

The changing of the primary carrier may comprise disconnecting control signal on the serving primary carrier and switching to the target primary carrier at action time which is comprised in the AAI_CM_CMD The method may further include performing ranging according to the ranging indicator field before a time in which the action time field represents.

The AAI_CM_CMD message may include an action code field that is used for distinguishing at least one operation of a change of the primary carrier and a change of an active state and an inactive state of a secondary carrier.

The method may further include receiving a message notifying that the primary carrier was changed from the serving primary carrier to the target primary carrier from the terminal.

The receiving of a message may be performed when the target primary carrier is in an inactive state.

The message notifying that the primary carrier was changed may be received through a carrier command indication (hereinafter referred to as an "AAI_CM_IND") message.

The method may further include: requesting, when the target primary carrier is in an inactive state, scanning of the target primary carrier; and receiving a scanning result from the terminal.

The method may further include: receiving a scanning request (AAI_SCN_REQ) message from the terminal; and transmitting a scanning response (AAI_SCN_RSP) message to the terminal.

The AAI_SCN_REQ message may include scanning interval information and a carrier index field of an active carrier to be used for scanning.

The AAI_SCN_RSP message may include scanning interval information and a carrier index field of an active carrier to be used for scanning.

The method may further include receiving a request for a change of the primary carrier from the terminal.

The request for a change of the primary carrier may be transferred through a carrier management request (AAI_CM_REQ) message, and the AAI_CM_REQ message may include a candidate list of the target primary carrier.

The method may further include receiving MSG acknowledgement of the primary carrier change command from the terminal.

Yet another embodiment of the present invention provides a terminal that supports a multi-carrier, including: a reception unit that receives a primary carrier change command from a base station; and a change unit that changes a primary carrier from a serving primary carrier to a target primary carrier according to the primary carrier change command.

The terminal may further include: a change request unit that requests a change of the primary carrier to the base station; and a scanning processor that performs, when the target primary carrier is in an inactive state, scanning of the target primary carrier.

The terminal may further include a command response unit that transmits a message that notifies the base station of the change.

Yet another embodiment of the present invention provides a management device of a base station that supports a multi-carrier, including: a change command unit that transmits a prime carrier change command to a terminal; and a reception unit that receives MSG acknowledgement of the prime carrier change command from the terminal.

The reception unit may further receive a change result of the primary carrier.

Yet another embodiment of the present invention provides a method in which a terminal that supports a multi-carrier manages a secondary carrier, the method including: receiving a change command of an active state and an inactive state of a secondary carrier from a base station; changing a state of the secondary carrier; and transmitting a message that notifies the base station of the change.

The method may further include: receiving, when the secondary carrier is in an inactive state, a request for scanning of the secondary carrier from the base station; and reporting a scanning result to the base station.

Yet another embodiment of the present invention provides a method in which a base station that supports a multi-carrier manages a secondary carrier, the method including: transmitting a change command of an active state and an inactive state of a secondary carrier to a terminal; and receiving a response that a state of the secondary carrier was changed from the terminal.

The method may include requesting, when the secondary carrier is in an inactive state, scanning of the secondary carrier; and receiving a result of the scanning from the terminal.

According to the present invention, by effectively managing and changing a multi-carrier in a wireless access system that supports a multi-carrier, transmission efficiency of the system can be improved.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

In this specification, a terminal may indicate a mobile station (MS), a mobile terminal (MT), a subscriber station (SS), a portable subscriber station (PSS), user equipment (UE), an access terminal (AT), etc., and may include the entire function or a partial function of the terminal, the MT, the SS, the PSS, the UE, the AT, etc.

In this specification, a base station (BS) may indicate an access point (AP), a radio access station (RAS), a node B, an evolved node B (eNode B), a base transceiver station (BTS), a mobile multihop relay (MMR)-BS, etc., and may include the entire function or a partial function of the AP, the RAS, the node B, the eNode B, the BTS, the MMR-BS, etc.

Now, a device and method for managing a carrier of a base station and a device and method for managing a carrier of a terminal according to an exemplary embodiment of the present invention will be described in detail with reference to the drawings.

Figure 1:
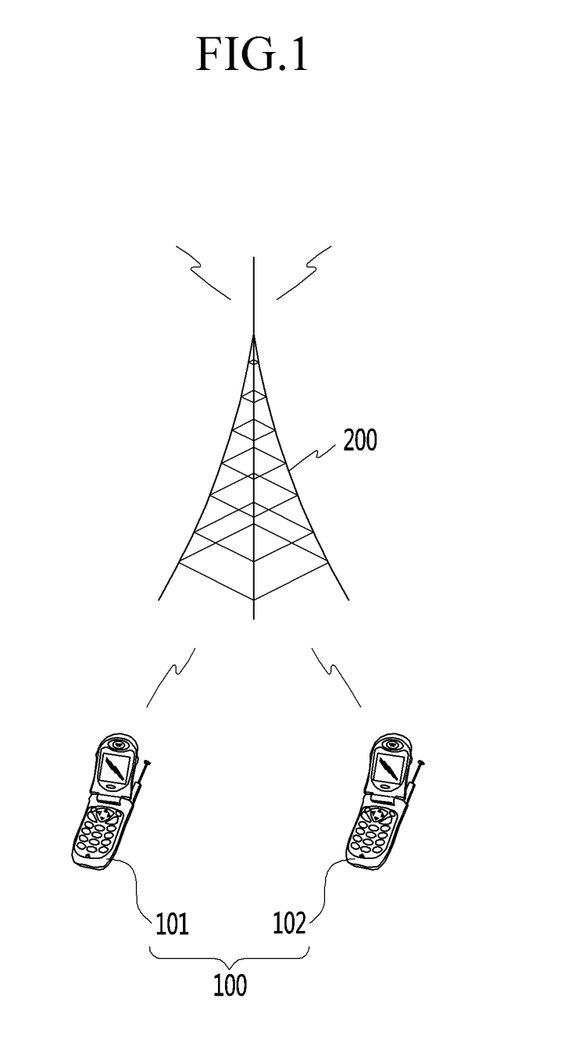
FIG. 1 is a diagram illustrating a mobile communication system according to an exemplary embodiment of the present invention.
Figure 2:
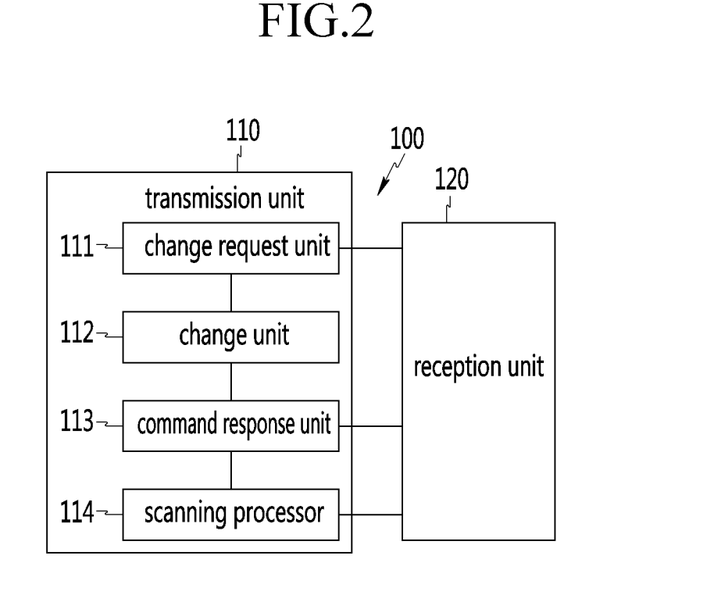
FIG. 2 is a block diagram illustrating a terminal according to an exemplary embodiment of the present invention.
Figure 3:
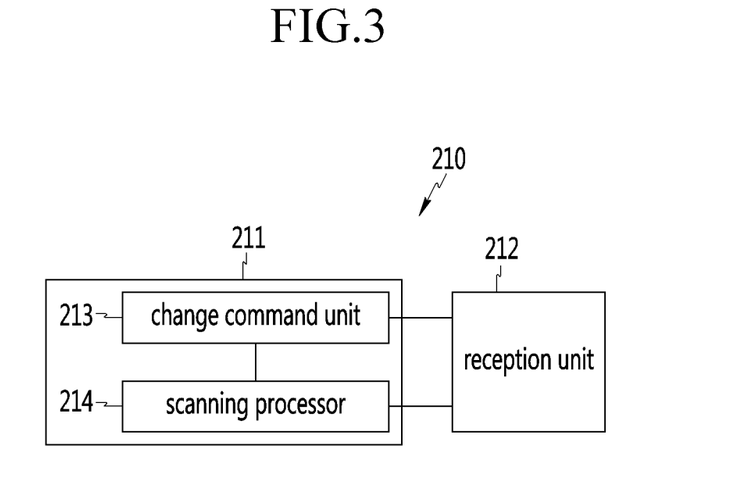
FIG. 3 is a block diagram illustrating a base station management device according to an exemplary embodiment of the present invention.

FIG. 1 is a diagram illustrating a mobile communication system according to an exemplary embodiment of the present invention, FIG. 2 is a block diagram illustrating a terminal according to an exemplary embodiment of the present invention, and FIG. 3 is a block diagram illustrating a base station management device according to an exemplary embodiment of the present invention.

Referring to FIG. 1, a mobile communication system includes terminals 100, 101, and 102, and a base station 200.

The terminal 100 is connected to the base station 200 and thus transmits and receives data and a control signal, and the base station 200 allocates resources to the terminal 100 and transmits and receives the data and the control signal to and from the terminal 100.

Referring to FIG. 2, the terminal 100 includes a transmission unit 110 and a reception unit 120.

The transmission unit 110 transmits a message that is related to carrier management to the base station 200, and includes a change request unit 111, a change unit 112, a command response unit 113, and a scanning processor 114.

The change request unit 111 requests a change of a primary carrier from the base station 200, or requests a change of an active state and an inactive state of a secondary carrier. The request of such a change is transferred through a carrier management request (hereinafter, referred to as an "AAI_CM_REQ") message.

The change unit 112 changes a primary carrier according to a command of the base station 200, or changes an active state and an inactive state of a secondary carrier.

The command response unit 113 receives a change command of a primary carrier or a change command of an active state and an inactive state of a secondary carrier from the base station 200, and transmits a completion response of a related operation thereof to the base station 200. Such a response is transferred through a carrier manage indication (hereinafter referred to as an "AAI_CM_IND") message.

The scanning processor 114 requests to scan a corresponding carrier when a carrier to be changed to a primary carrier is in an inactive state, or reports a scanning result to the base station 200. Such a request is transferred through a scanning request (hereinafter referred to as an "AAI_SCN_REQ") message, and the scanning result is transferred through a scanning report (hereinafter referred to as an "AAI_SCN_REP") message.

The reception unit 120 receives a change command of the primary carrier or a change command of an active state and an inactive state of the secondary carrier from the base station 200. Further, the reception unit 120 may receive a scanning response of a scanning request from the base station 200.

Referring to FIG. 3, a base station management device 210 according to an exemplary embodiment of the present invention is a portion that is included in the base station 200, and manages carrier operation of the base station 200. The base station management device 210 includes a transmission unit 211 and a reception unit 212.

The transmission unit 211 includes a change command unit 213 and a scanning processor 214.

The change command unit 213 commands a change of the primary carrier to the terminal 100, or commands a change of an active state and an inactive state of the secondary carrier. Such a command is transferred through a carrier management command (hereinafter referred to as an "AAI_CM_CMD") message.

The scanning processor 214 transmits a scanning response of a scanning request from the terminal 100. Such a response is transferred through a scanning response (hereinafter referred to an "AAI_SCN_REP") message.

The reception unit 212 receives an AAI_CM_REQ message, an AAI_CM_IND message, an AAI_SCN_REQ message, and an AAI_SCN_REP message from the terminal 100.

Now, a method of changing a primary carrier according to an exemplary embodiment of the present invention will be described in detail with reference to FIG. 4.

Figure 4:
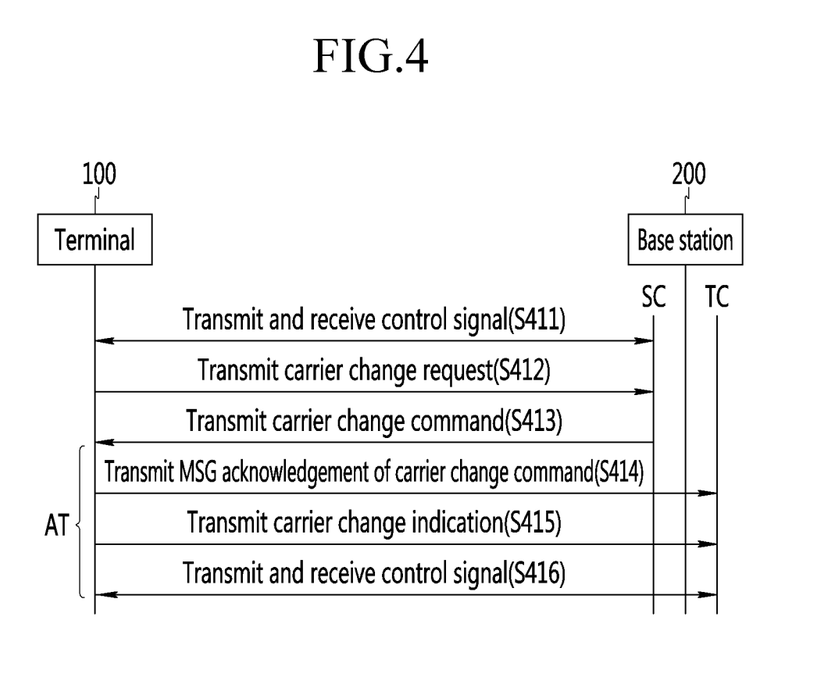
FIG. 4 is a flowchart illustrating a method of changing a primary carrier according to an exemplary embodiment of the present invention.

FIG. 4 is a flowchart illustrating a method of changing a primary carrier according to an exemplary embodiment of the present invention.

Referring to FIG. 4, the terminal 100 and the base station 200 transmit and receive a control signal (S411). Thereafter, the terminal 100 transmits a carrier change request for changing a primary carrier from a serving primary carrier SC to a target primary carrier TC to the base station 200, as needed (S412). Step S412 is performed through an AAI_CM_REQ message. The AAI_CM_REQ message includes a candidate carrier list for the target primary carrier TC.

Thereafter, the base station 200 transmits a carrier change command to the terminal 100 (S413). Step S413 is performed through the AAI_CM_CMD message.

In this case, the AAI_CM_CMD message includes a target primary carrier index field, an indication field of the next state of a serving primary carrier, an action time (AT) field, and a ranging indicator field. Here, when the terminal 100 does not support carrier aggregation, an indication field of the next state of a serving primary carrier is always set to "0". The action time (AT) indicates a time in which the terminal 100 is changed to a target primary carrier and a time to be prepared to communicate through a target primary carrier. When the "indication field of the next state of a serving primary carrier" is set to "1", a previous primary carrier sustains an active state as a secondary carrier even after the change. When the "indication field of the next state of a serving primary carrier" is set to "0", a previous primary carrier is deactivated after a primary carrier change procedure.

When allocation information about a "target primary carrier index field" is not included, a new "target primary carrier index field" of the previous primary carrier is automatically allocated to a previous "target primary carrier index field" of a new primary carrier.

The terminal 100 can complete reception preparation of data and control information with a target primary carrier until a time in which an action time field is represented, and before a time in which an action time field is represented, the terminal 100 can perform ranging according to a ranging indicator field, as needed.

The AAI_CM_CMD message can be used as a use other than a message for changing a primary carrier, and when an action code field that is included in the AAI_CM_CMD message is set to "1", the AAI_CM_CMD message can be used as a message for changing a primary carrier.

The terminal 100 changes a primary carrier from a present primary carrier SC to a target primary carrier TC at an action time AT.

The terminal 100 transmits MSG acknowledgement of a carrier change command to the base station 200 (S414).

Thereafter, the terminal 100 transmits a carrier change indication to the base station 200 (S415). Step S415 is performed through an AAI_CM_IND message. The base station 200 recognizes that a primary carrier change procedure is complete by receiving the AAI_CM_IND message.

Thereafter, the terminal 100 and the base station 200 transmit and receive a control signal through the target primary carrier TC (S416).

When the terminal 100 is prepared to transmit and receive data and a control signal through the target primary carrier TC, the terminal 100 can transmit a band request message in which a request band size is 0 to the base station 200. When the base station 200 receives a band request message from the terminal 100 through the target primary carrier TC, the base station 200 regards that the change is complete with the target primary carrier TC and transmits data and a control signal of the terminal 100 using the target primary carrier TC.

A procedure of FIG. 4 is performed in a case of using any one of activated secondary carriers of the terminal 100 as the target primary carrier TC. The target primary carrier TC is limited to a fully configured carrier in order to perform an individual wireless access among assigned carriers between the terminal 100 and the base station 200.

In this way, by defining a message that changes a primary carrier, as needed, carrier operation of a wireless communication system that supports a multi-carrier can be effectively performed.

Now, a method of changing a primary carrier according to another exemplary embodiment of the present invention will be described in detail with reference to FIG. 5.

Figure 5:
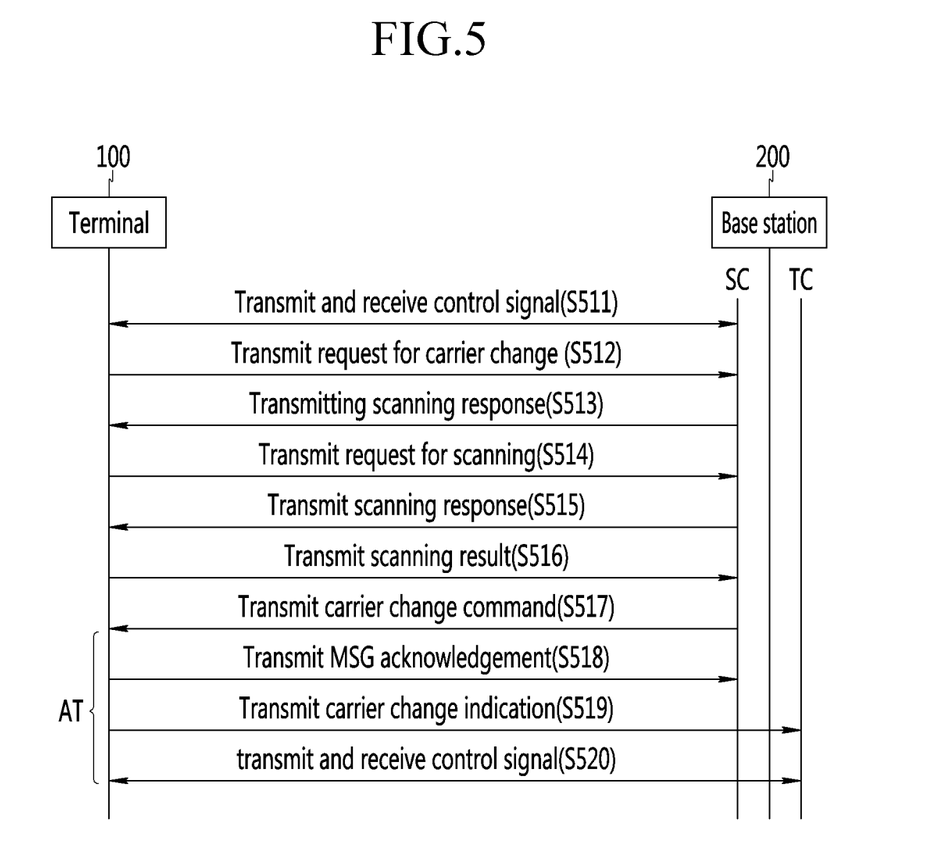
FIG. 5 is a flowchart illustrating a method of changing a primary carrier according to another exemplary embodiment of the present invention.

FIG. 5 is a flowchart illustrating a method of changing a primary carrier according to another exemplary embodiment of the present invention.

Referring to FIG. 5, the terminal 100 and the base station 200 transmits and receives a control signal (S511). Thereafter, the terminal 100 transmits a carrier change request for a change of a primary carrier from a serving primary carrier to a target primary carrier to the base station 200, as needed (S512). Step S512 is performed through an AAI_CM_REQ message.

In this case, when a target primary carrier TC is in an inactive state, before changing a primary carrier, a channel of a target primary carrier TC, which is an inactive state, can be measured. For this purpose, the base station 200 transmits a scanning response to the terminal 100 through an AAI_S-CN_RSP message (S513). In this case, the AAI_SCN_RSP message includes a list of carriers in which channel measurement information is necessary, and the list of carriers may be a subset of a carrier in an inactive state of the terminal 100.

The terminal 100 transmits a request for stopping another communication and performing scanning to the base station 200 through an AAI_SCN_REQ message (S514).

Thereafter, the base station 200 transmits a response thereof to the terminal 100 through an AAI_SCN_RSP message (S515).

The terminal 100 transmits a report of a scanning result to the base station 200 through an AAI_SCN_REP message (S516). The base station 200 determines whether to change a primary carrier through a report of the scanning result.

Thereafter, as described with reference to FIG. 4, the base station 200 transmits a carrier change command to the terminal 100 through the AAI_CM_CMD message (S517), the terminal 100 transmits MSG acknowledgement of a carrier change command to the base station 200 (S518), the terminal 100 transmits a carrier change indication to the base station 200 through an AAI_CM_IND message (S519), and the terminal 100 and the base station 200 transmit and receive a control signal through a changed target primary carrier TC (S520).

Now, a method of changing a state of a secondary carrier according to an exemplary embodiment of the present invention will be described in detail with reference to FIG. 6.

Figure 6:
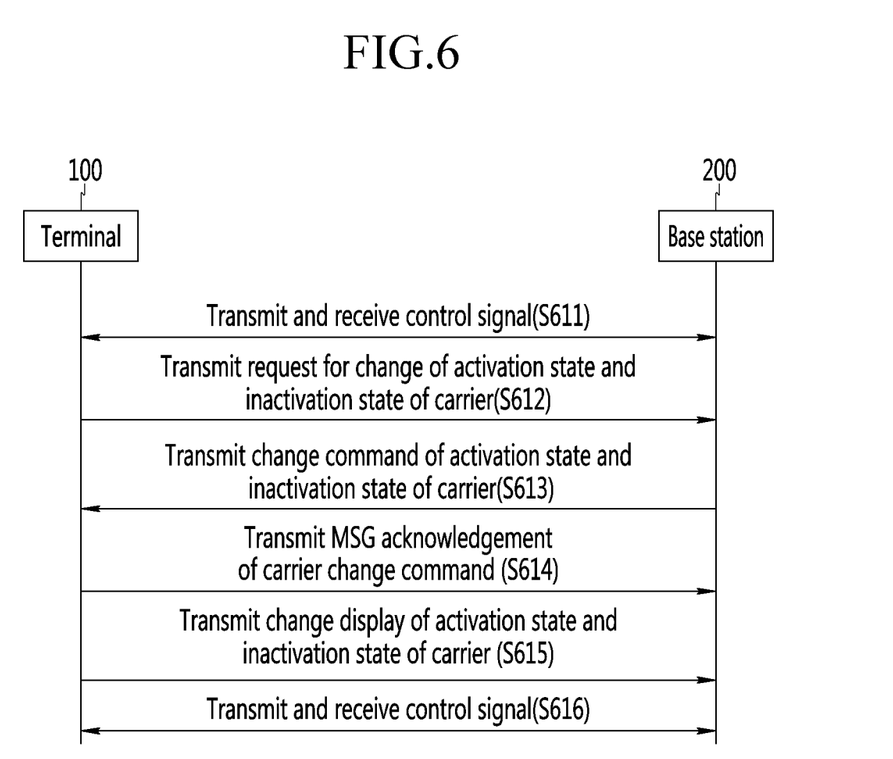
FIG. 6 is a flowchart illustrating a method of changing a state of a secondary carrier according to an exemplary embodiment of the present invention.

FIG. 6 is a flowchart illustrating a method of changing a state of a secondary carrier according to an exemplary embodiment of the present invention.

Referring to FIG. 6, the terminal 100 and the base station 200 transmit and receive a control signal (S611). Thereafter, the terminal 100 transmits a request for a change of an active state and an inactive state of a carrier to the base station 200, as needed (S612). Step S612 is performed through an AAI_CM_REQ message.

Thereafter, the base station 200 transmits a change command of an active state and an inactive state of a carrier to the terminal 100 (S613). Step S613 is performed through the AAI_CM_CMD message.

In this case, the AAI_CM_CMD message includes a physical carrier index field of a target secondary carrier, a logical carrier index field of a target secondary carrier, a ranging indicator, and an action time. When a dedicated ranging code is included in the AAI_CM_CMD message, ranging is performed with a secondary carrier to be activated using the dedicated ranging code. In this case, a dedicated ranging code of the base station 200 is used as a means for confirming that activation of the secondary carrier is successfully completed.

The terminal 100 transmits MSG acknowledgement of a carrier change command to the base station 200 (S614), the terminal 100 transmits a change indication of an active state and an inactive state of a carrier to the base station 200 through an AAI_CM_IND message (S615), and the terminal 100 and the base station 200 transmit and receive a control signal (S616).

Now, a method of changing an active state and an inactive state of a secondary carrier according to another exemplary embodiment of the present invention will be described in detail with reference to FIG. 7.

Figure 7:
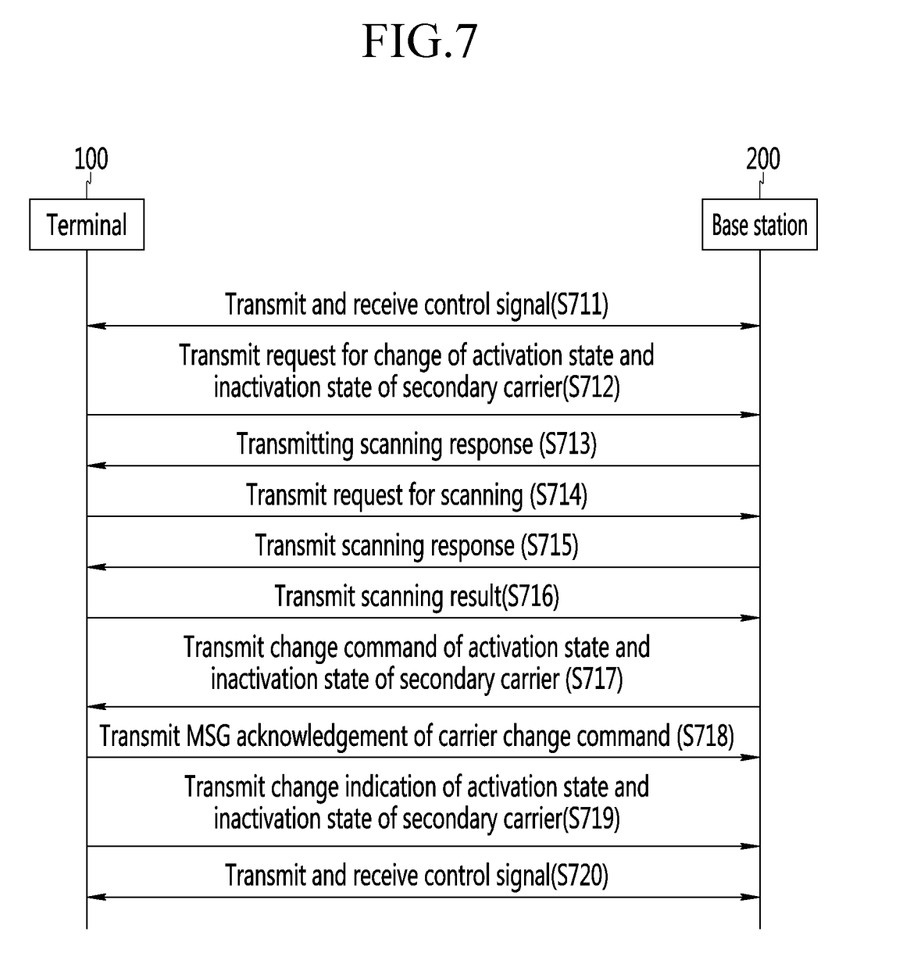
FIG. 7 is a flowchart illustrating a method of changing an active state and an inactive state of a secondary carrier according to another exemplary embodiment of the present invention.

FIG. 7 is a flowchart illustrating a method of changing an active state and an inactive state of a secondary carrier according to another exemplary embodiment of the present invention.

Referring to FIG. 7, the terminal 100 and the base station 200 transmit and receive a control signal (S711). Thereafter, the terminal 100 transmits a request for a change of an active state and an inactive state of a secondary carrier to the base station 200 through an AAI_CM_REQ message (S712).

In this case, when the secondary carrier is in an inactive state, a channel of the secondary carrier is measured. For this purpose, the base station 200 transmits a scanning response to the terminal 100 through an AAI_SCN_RSP message (S713).

Thereafter, the terminal 100 transmits a request for stopping another communication and performing scanning to the base station 200 through an AAI_SCN_REQ message (S714). Thereafter, the base station 200 transmits a response thereof to the terminal 100 through the AAI_SCN_RSP message (S715). The terminal 100 transmits a report of a scanning result to the base station 200 through an AAI_SCN_REP message (S716).

Thereafter, the base station 200 transmits a change command of an active state and an inactive state of a secondary carrier to the terminal 100 through the AAI_CM_CMD message (S717), the terminal 100 transmits MSG acknowledgement of a carrier change command to the base station 200 (S718), the terminal 100 transmits a change indication of an active state and an inactive state of a secondary carrier to the base station 200 through an AAI_CM_IND message (S719), and the terminal 100 and the base station 200 transmit and receive a control signal (S720).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of managing a primary carrier in a terminal supporting multi-carriers, the method comprising:
   receiving a primary carrier change command from a base station; and
   changing the primary carrier from a serving primary carrier to a target primary carrier,
   wherein the primary carrier change command comprises an indication field indicating whether the serving primary carrier is kept active or deactivated after the primary carrier changes.

2. The method of claim 1, wherein changing the primary carrier is performed without a scanning operation when the target primary carrier is one of a number of active carriers, and is performed after scanning the target primary carrier when the target primary carrier is in an inactive state.

3. The method of claim 1, wherein the serving primary carrier is deactivated after the primary carrier change in case the terminal does not support carrier aggregation.

4. A method of managing primary carrier in a base station supporting multi-carriers, the method comprising:
   transmitting and receiving a control signal to and from a terminal using a serving primary carrier; and
   transmitting a primary carrier change command to the terminal to change the primary carrier from the serving primary carrier to a target primary carrier,
   wherein the primary carrier change command comprises an indication field indicating whether the serving primary carrier is kept active or deactivated after the primary carrier changes.

5. The method of claim 4, further comprising:
   requesting scanning of the target primary carrier when the target primary carrier is in an inactive state; and
   receiving a scanning result from the terminal.

6. The method of claim 5, further comprising:
   receiving a scanning request (AAI-SCN-REQ) message from the terminal; and
   transmitting a scanning response (AAI-SCN-RSP) message to the terminal.

7. The method of claim 6, wherein:
   the AAI-SCN-REQ message comprises scanning interval information and a carrier index of an active carrier to be used for scanning.

8. The method of claim 4, wherein the primary carrier change command is received through a carrier management command (AAI-CM-CMD) message.

9. The method of claim 8, wherein the AAI-CM-CMD message comprises a ranging indicator.

10. The method of claim 9, wherein when the indication field is set to "1", the serving primary carrier is kept active after the primary carrier changes, and when the indication field is set to "0", the serving primary carrier is deactivated after the primary carrier changes.

11. The method of claim 10, wherein after the primary carrier changes, a new carrier index of the serving primary carrier is allocated to a previous carrier index of the target primary carrier, and a new carrier index of the target primary carrier is allocated to a previous carrier index of the serving primary carrier.

12. The method of claim 10, wherein the primary carrier change command comprises an action time for changing the primary carrier, and the terminal switches to the target primary carrier at the action time.

13. The method of claim 10, further comprising performing ranging according to the ranging indicator before an action time, wherein the primary carrier change command comprises the action time for changing the primary carrier.

14. The method of claim 8, wherein the AAI-CM-CMD message comprises an action code field that is used for distinguishing at least one operation of a change of the primary carrier and a change of an active state and an inactive state of a secondary carrier.

15. The method of claim 4, further comprising receiving a message notifying that the primary carrier was changed from the serving primary carrier to the target primary carrier from the terminal.

16. The method of claim 15, wherein the receiving the message is performed when the target primary carrier is in an inactive state.

17. The method of claim 15, wherein the message notifying that the primary carrier was changed is received through a carrier management indication message.

18. The method of claim 4, further comprising receiving a request for a change of the primary carrier from the terminal.

19. The method of claim 18, wherein a request for a change of the primary carrier is transferred through a carrier management request (AAI_CM_REQ) message, and the AAI_CM_REQ message comprises a candidate list of the target primary carrier.

20. The method of claim 4, wherein the serving primary carrier is deactivated after the primary carrier change in case the terminal does not support carrier aggregation.

* * * * *